April 13, 1943. T. W. NILSEN 2,316,530
CRANK UNIT
Filed May 3, 1941 2 Sheets-Sheet 2

Inventor
Torval W. Nilsen,
By McMorrow & Berman
Attorneys

Patented Apr. 13, 1943

2,316,530

UNITED STATES PATENT OFFICE 2,316,530

CRANK UNIT

Torval W. Nilsen, Snelling, Calif.

Application May 3, 1941, Serial No. 391,786

1 Claim. (Cl. 74—594.3)

This invention relates to crank units, either of the hand or foot operated type, and has for the primary object the provision of a device of this character which will automatically increase the leverage thereof as the load thereon increases and will automatically decrease the leverage thereof as the load decreases, thus providing a device wherein manual effort may be conserved to a maximum amount and lend itself applicable to most any manually actuated rotary drive, such as a bicycle, hand operated winch and many other similar devices.

Another object of this invention is the provision of a device of the above stated character wherein its construction will be extremely compact, durable and efficient and may be easily and quickly adjusted as to its spring resistance without the use of special tools and may be rendered inoperative as to the variance in leverage at any time desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation partly in section illustrating a crank unit constructed in accordance with my invention and showing the application thereof to a portion of a bicycle drive.

Figure 1:
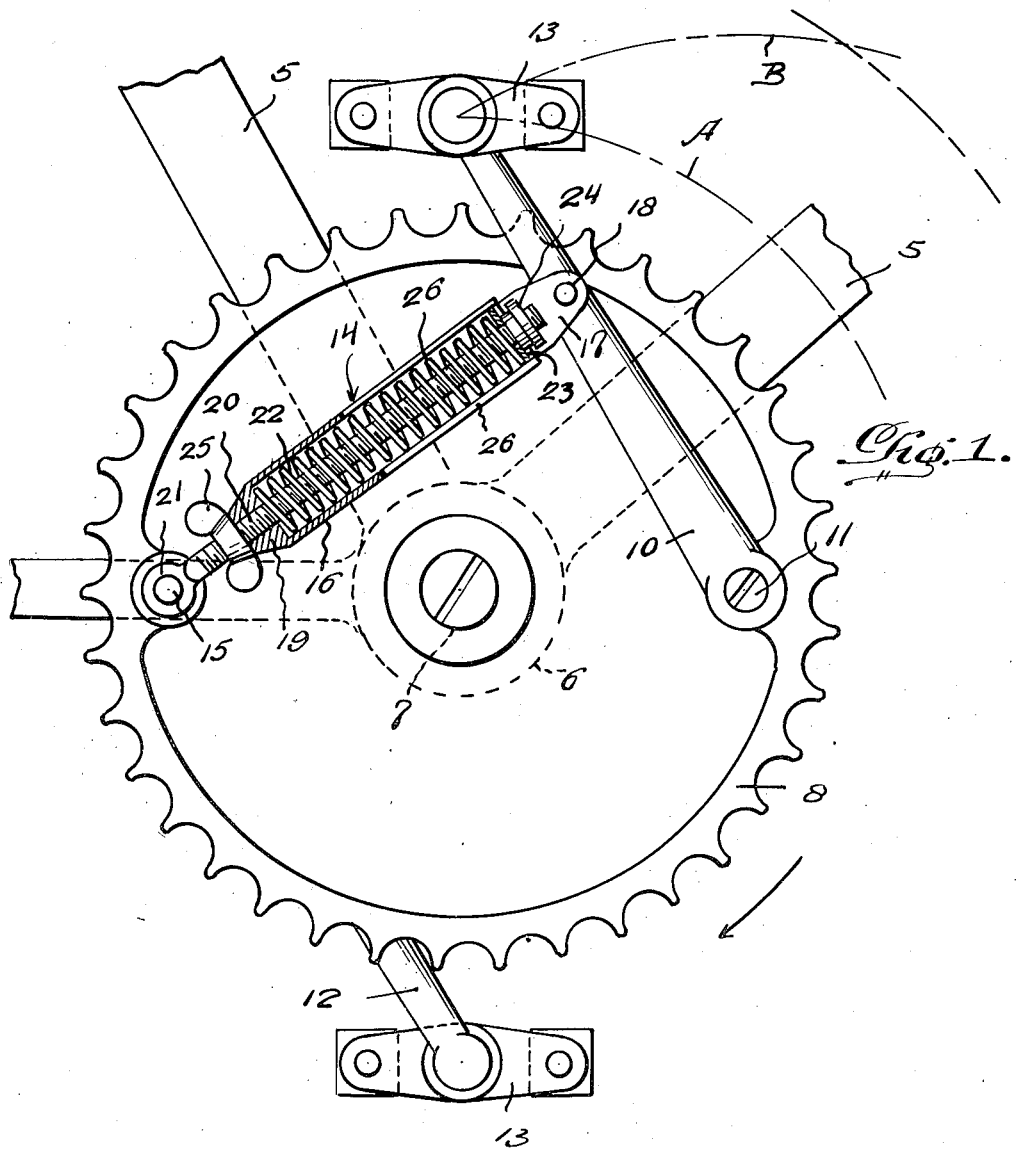
Figure 2:
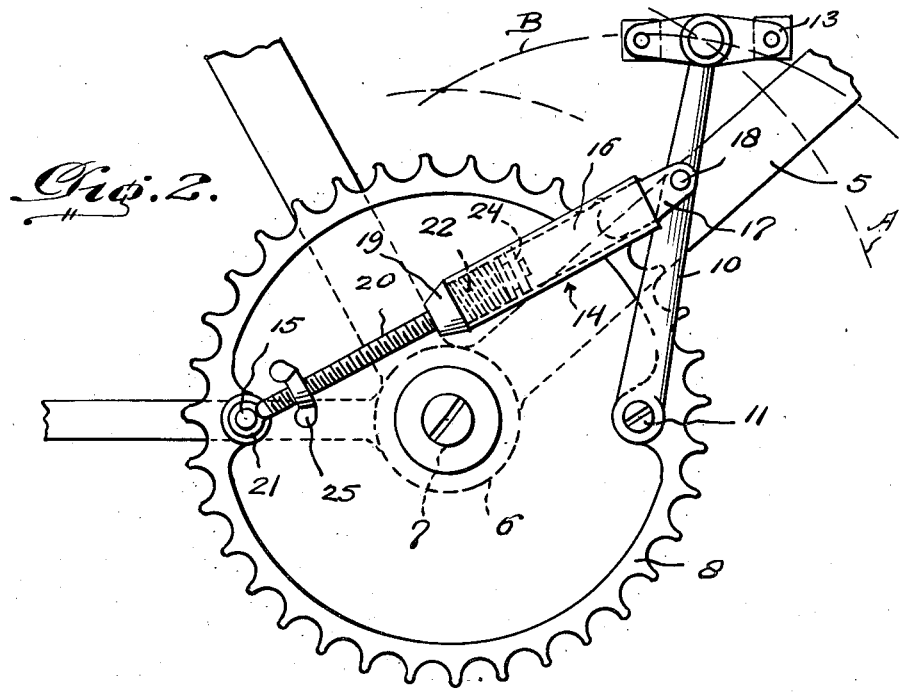
Figure 2 is a side elevation illustrating the crank unit extended to approximately its full limit of leverage increase.

It will be seen by reference to the drawings that I have elected to show the principle of operation of my invention applied to a bicycle drive. However, it is to be understood that the principle of operation of this invention can be carried out in other manually actuated rotary drive devices such as a hand operated winch and the like and which will be hereinafter more fully described.

Referring in detail to the drawings, the numeral 5 indicates a fragmentary portion of a bicycle frame, 6 the journal for the usual foot cranks of the drive mechanism. In the application of this invention to a bicycle frame, a shaft 7 is mounted in the journal 6 and one end thereof has secured thereto the usual drive sprocket gear 8 while the other end has secured thereto a plate 9 acting as far as the present invention is concerned as an equivalent element to the sprocket gear 8.

Figure 3:
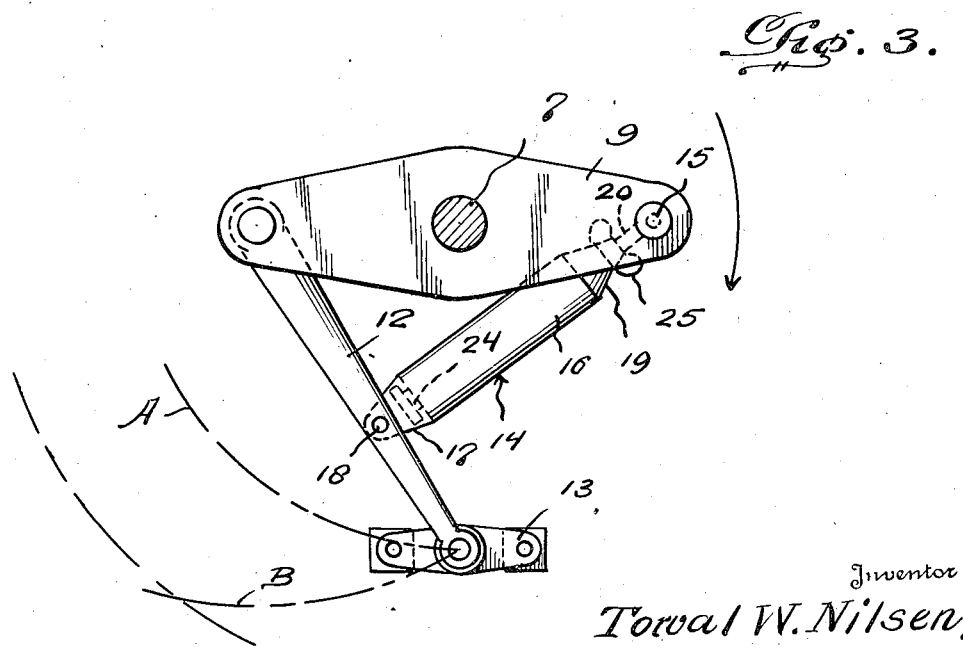
Figure 3 is a side elevation, partly in section, illustrating the principle of this invention for application to the non-sprocket crank of the bicycle.

The plate 9 may be of circular shape or of elliptical shape, as shown in Figure 3. Further, it is to be understood that the sprocket gear 8 is located upon one side of the frame 5 while the plate 9 is located upon the opposite side of said frame 5.

A pedal arm 10 is eccentrically pivoted to the sprocket gear, as shown at 11, and a pedal arm 12 is pivotally connected to the plate 9 adjacent one of its ends. The arms 10 and 12 are equipped with the usual foot pedals 13.

Spring tensioning devices 14 are pivotally connected to the arms 10 and 12 closer to the pedals 13 than to the pivoted ends of said arms and one of the spring tensioning devices 14 is pivotally connected to the sprocket gear 8, as shown at 15, while the other spring tensioning device is pivoted to the other end of the plate 9. It will be seen that the pivot 15 is directly opposite to the pivot 11 on the sprocket gear 8. The normal action of the spring tensioning devices is to maintain the pedal arms 10 and 12 in leverage position of approximately the same as that of ordinary pedal arms on the bicycle, as for instance said arms being secured to the ends of the shaft 7 journaled in the frame. Or in other words, the action of the spring tensioning devices when the device is operating under a light load is for the pedals to travel in the arc indicated by the character A. However, as load increases the leverage of the pedal arms increases until they travel in the arc indicated by the character B, the pedals traveling in the arc B when the unit is operating under maximum load and providing the maximum amount of leverage. Further, it will be seen by reference to Figure 1 that the sprocket gear 8 rotates in the direction indicated by the arrow while the plate 9 rotates in the direction indicated by the arrow in Figure 3.

Further it will be seen that due to the arrangement of the spring tensioning devices 14 the leverage of the pedal arm may increase under increasing load on the down stroke, while the spring devices act to restore the pedal arms on their non-working strokes to the shortest distance of travel which materially decreases manual effort on the part of the operator.

Each spring tensioning device consists of a substantially tubular shaped housing 16, one end of which is provided with an apertured ear 17 to receive the pivot pin 18 connecting said housing onto the pedal arms. The other end of the housing 16 is internally reduced to form a combined guide and seat 19 through which slides a screw threaded rod 20. The outer end of the rod has an apertured bifurcated portion 21 to receive the pivot pin 15 and also to straddle the sprocket gear which is preferably of the spoked skeleton formation allowing the spring tensioning device to be brought in close relation to the sprocket gear or to the plate 9.

Located in the housing 16 is a coil spring 22, one end of which bears against the combined seat and guide 19 of said housing while the other end bears against a washer 23 adjustably mounted on the rod by an adjusting nut 24. A stop nut 25 is threaded on the rod externally of the housing for one end thereof to rest against. Thus it will be seen that the housing 16 which is pivotally connected to the pedal arm is free to slide relative to the rod and against the action of the spring 22, the tension of which can be conveniently varied by the adjusting nut 24. The nuts 24 and 25 may be of any type, however, it is believed that nuts of the wing type would be most preferable. Also in order that the adjusting nut 24 may be held against accidental movement, the housing 16 in its upper and lower portions at one end thereof is provided with slots 26 in which said nut 24 may seat.

By the arrangement of the stop nut 25 and the spring adjusting nut 24 will permit the device to be rendered inoperative as to its variance of increase and decrease of leverage when desired by simply adjusting said nuts 24 and 25 toward each other so that there will be practically no relative movement between the housing 16 and the rod.

In operation it will be seen by reference to Figure 1 when the pedal 13 is in its uppermost position ready for its working or downward stroke that the leverage of said pedal is decreased to a minimum through the arrangement of the spring device. If the load remains light the pedal will travel in the arc A at its minimum leverage. However, as the load increases the pedal then travels in a downward direction with an increased leverage which may extend to the arc indicated by the character B. Consequently, it is very apparent that applicant has provided a very efficient, automatic leverage increasing and decreasing device governed entirely by the amount of load on said device.

As previously mentioned, this unit may be employed for many other rotary drives other than the drive mechanism of a bicycle. In adapting the unit to other devices the same principle of construction will be involved. As for instance, when the unit is applied to a hand hoist it may be desirable to employ a stiffer spring and that the housing 16 be pivoted closer to the pivot of the operating arm so as to allow said arm to swing in approximately 180 degrees and in either direction thereby giving the maximum range of leverage.

While I have shown and described the preferred embodiment of my invention, it will be understood that minor changes in construction, combination and arrangement of parts may be made without departing from the spirit and scope of the invention as claimed.

Having thus described my invention, what I claim is:

In a bicycle drive unit, the combination with a pedal shaft having a sprocket gear secured thereto and mounted for rotation and a pair of rigid pedal arms each having secured to one end a foot pedal, of an elongated member secured intermediate its ends to said shaft and having the other end of one of the arms pivoted to one end thereof, the other end of the other pedal arm being pivoted on the sprocket gear eccentrically of the axis of rotation of the shaft, and spring tensioned devices pivoted to said arms closer to said pedals than to the pivots of the arms and one of said tensioned devices pivoted on the sprocket gear eccentrically of the axis of rotation of the sprocket gear and the shaft and the other tensioned device pivoted on the other end of said elongated member eccentrically of the axis of rotation of the shaft, said spring tensioned devices each including a stop nut and a spring tension adjusting nut, said nuts being manually adjustable to render the tensioned devices operative and inoperative.

TORVAL W. NILSEN.